(12) United States Patent
Paulino

(10) Patent No.: US 6,701,666 B1
(45) Date of Patent: Mar. 9, 2004

(54) SYSTEM FOR DOMESTIC CULTIVATION OF EXOTIC PLANTS INCLUDING IN-GROUND IRRIGATION AND AERATION SYSTEM

(76) Inventor: Romulo B. Paulino, 1822 N. Ave. 53, Los Angeles, CA (US) 90042

( * ) Notice: Subject to any disclaimer, the term of this patent is extended or adjusted under 35 U.S.C. 154(b) by 89 days.

(21) Appl. No.: 10/254,625

(22) Filed: Sep. 25, 2002

Related U.S. Application Data

(63) Continuation-in-part of application No. 09/642,415, filed on Aug. 19, 2000.

(51) Int. Cl.⁷ .................................................. A01H 3/00
(52) U.S. Cl. ................... 47/58.1 SC; 47/1.01 R
(58) Field of Search ....................... 47/58.1, 1.01 R, 47/65.6, 58.1 SC, 58.1 R, 239

(56) References Cited

U.S. PATENT DOCUMENTS

| | | | | |
|---|---|---|---|---|
| 1,171,558 A | * | 2/1916 | Taylor | 47/1.01 R |
| 1,171,559 A | * | 2/1916 | Taylor | 47/1.01 R |
| 1,171,560 A | * | 2/1916 | Taylor | 47/58.1 R |
| 1,935,090 A | * | 11/1933 | Holland | 405/129.9 |
| 3,996,865 A | * | 12/1976 | Dwyer | 47/1.01 R |
| 4,462,184 A | * | 7/1984 | Cunningham | 47/58.1 R |
| 5,472,458 A | * | 12/1995 | Ogawa et al. | 47/1.01 R |
| 5,492,434 A | * | 2/1996 | Adams et al. | 405/36 |
| 5,580,192 A | * | 12/1996 | Ogawa et al. | 405/263 |
| 5,608,989 A | * | 3/1997 | Behrens | 47/65.9 |
| 6,115,959 A | * | 9/2000 | Schusterick | 47/1.01 R |
| 6,141,905 A | * | 11/2000 | Rozental et al. | 47/58.1 R |
| 6,189,263 B1 | * | 2/2001 | Solis | 47/65.6 |
| 6,476,217 B1 | * | 11/2002 | Tamion | 536/124 |

* cited by examiner

Primary Examiner—Robert P. Swiatek
Assistant Examiner—Bethany L Griles
(74) Attorney, Agent, or Firm—Goldstein & Lavas, P.C.

(57) ABSTRACT

A system for cultivating tropic plants in a planting area having a ground surface. A hole is initially dug to a depth of approximately three feet below the ground surface. A layer of ceramic tiles is established at the bottom of the hole, and is covered with a layer of small rocks. A tank having a plurality of wick assemblies extending upward therefrom is positioned within the hole. A layer of vegetative cuttings and manure is established thereabove. Then fertile topsoil originally from the hole is replaced in a mix with sand to a depth of substantially one foot. The contents are allowed to settle and are thoroughly watered, the tank is filled using a fill hose. The exotic plants is then planted in potting soil thereabove, and is maintained and allowed to thrive by the unique moisture, nutritive and thermodynamic properties established by the various layers. When necessary, the tank is refilled through the fill hose.

13 Claims, 4 Drawing Sheets

US 6,701,666 B1

SYSTEM FOR DOMESTIC CULTIVATION OF EXOTIC PLANTS INCLUDING IN-GROUND IRRIGATION AND AERATION SYSTEM

CROSS REFERENCES AND RELATED SUBJECT MATTER

This application is a continuation in part of utility patent application Ser. No. 09/642,415, filed in the United States Patent & Trademark Office on Aug. 19, 2000.

BACKGROUND OF THE INVENTION

The invention relates to a system for domestic cultivation of exotic plants. More particularly, the invention relates to a system that allows exotic plants to grow in colder and dryer climates, in which such plants would not ordinarily thrive or even survive, by providing an ordered soil layering an in-ground irrigation and aeration system.

Some of the most beautiful plants are found in exotic settings. In particular, many sought-after species of flowers are only found growing in The Orient. When western gardeners seek to grow these plants under the climate conditions of their own locale, such plants will not thrive, and will typically die. Even if these plants live during the summer, they will not typically survive the winter, even in the warmest climates in the United States.

One attempted solution is to grow such plants indoors. However, indoor nurseries can only cultivate a plant and keep it healthy while it remains indoors. Thus, they are suitable for commercial production of plants for medical uses and the like. They still do not allow these plants to be enjoyed in a more natural outdoor garden setting.

My previous patent application, Ser. No. 09/642,415, describes a cultivation system which helps maintain proper temperature and soil moisture, and thereby provides proper conditions for cultivating exotic plants in otherwise unsuitable environments. However, the invention as described therein relies upon periodic manual irrigation. What is needed is a system that can provide all of the benefits of my previous invention, yet also provides time-released irrigation and provides the additional benefits associated with soil aeration.

U.S. Pat. No. 4,920,694 to Higa discloses a method for culturing plants, which involves creating a soil filled cavity within the ground, sealing it from the surroundings with a moisture-proof barrier, extending a pipe through the cavity, and providing continuous irrigation to the plants with permeable portions of the pipe.

Accordingly, while these units may be suitable for the particular purpose employed, or for general use, they would not be as suitable for the purposes of the present invention as disclosed hereafter.

SUMMARY OF THE INVENTION

It is an object of the invention to produce a system, which allows exotic plants to be cultivated in colder and dryer domestic settings. Accordingly, the present invention provides a system that allows these plants to thrive despite the colder weather encountered in climates such as those found in the United States, and dryer climates found therein.

It is a further object of the invention to provide a system that allows exotic plants to grow at a faster rate. Accordingly, the present invention provides unique moisture, aeration, heat retention, and nutritive properties, which are ideally suited to the cultivation of exotic plants.

It is another object of the invention to provide a system that substantially increases the moisture within the soil and allows the plants to be irrigated automatically. Accordingly, the system provides an elongated underground tank, which holds water and releases the water into the soil over a period of time. The tank may be automatically filled by a solenoid working in conjunction with a moisture sensor when the moisture level within the tank drops below a calibrated level.

It is still another object of the invention to provide a system that provides constant moisture to the plants. Accordingly, a plurality of wick assemblies extend upward from the water tank, to slowly carry moisture to the plant roots by capillary action.

It is a still further object of the invention to provide a system that aids in the aeration of the plants. Accordingly, when the tank is empty it contains air. As the tank is filled the air therein is forced to release into the soil. As the tank slowly empties air is pulled into the tank. In this regard, the fill hose can act as a vent to the region underneath the planting area. Accordingly the use of the tank promotes aeration of the soil.

It is still another object of the invention to provide a system that is simple to implement. Accordingly, the system requires the installation of a small tank and the careful, ordered layering of the specified materials. The tank and the controlled layering according to the present invention provide an idealized environment for exotic plants to thrive.

The invention is a system for cultivating tropic plants in a garden having a ground surface. A hole is initially dug to a depth of approximately three feet below the ground surface. A layer of ceramic tiles is established at the bottom of the hole, and is covered with a layer of small rocks. A water tank having a tank interior is placed on the top of the rocks, the water tank having a plurality of wicking mechanisms in communication with the tank interior. Then layers of vegetative cuttings and manure are established on top of the tank. Then fertile topsoil originally from the hole is replaced in a mix with sand to a depth of substantially one foot. The contents are allowed to settle and are thoroughly watered. The tank is filled with water through a fill hose, which extends above the ground surface. The exotic plant is then planted in potting soil thereabove, and is maintained and allowed to thrive by moisture rising through the wicking devices, as well as nutritive and thermodynamic properties established by the various layers.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
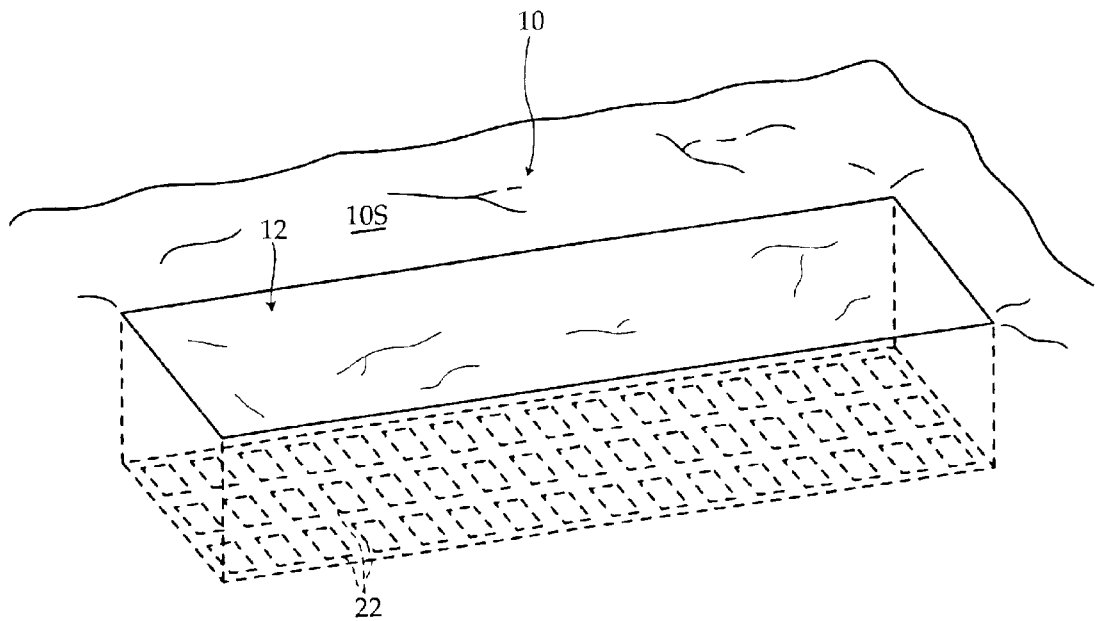
FIG. 1 is a diagrammatic perspective view, illustrating early steps of the inventive system, wherein a hole has been dug and soil removed from the ground, and wherein a base layer of tiles has been placed at the bottom of the hole.

FIG. 1 illustrates a planting area 10, having a ground surface 10S. A hole 12 has been dug within said planting area 10. The hole 12 preferably extends about three feet below the ground surface 10S. When the hole 12 is dug, topsoil 15 extending approximately one foot of the soil depth is stored in a storage bin such as a wheelbarrow. The remaining soil will not be used and should be set aside. The hole 12 is illustrated in FIG. 1 as having finite boundaries. However the hole 12 may in fact be a trench or canal of considerable length.

Once the hole 12 has been dug to a satisfactory depth, a base layer 20 is created using ceramic tiles 22. The tiles 22 are preferably standard four inch by four inch shiny (glazed) tiles, and are placed close together, with a gap between tiles which is preferably one half inch.

Figure 2:
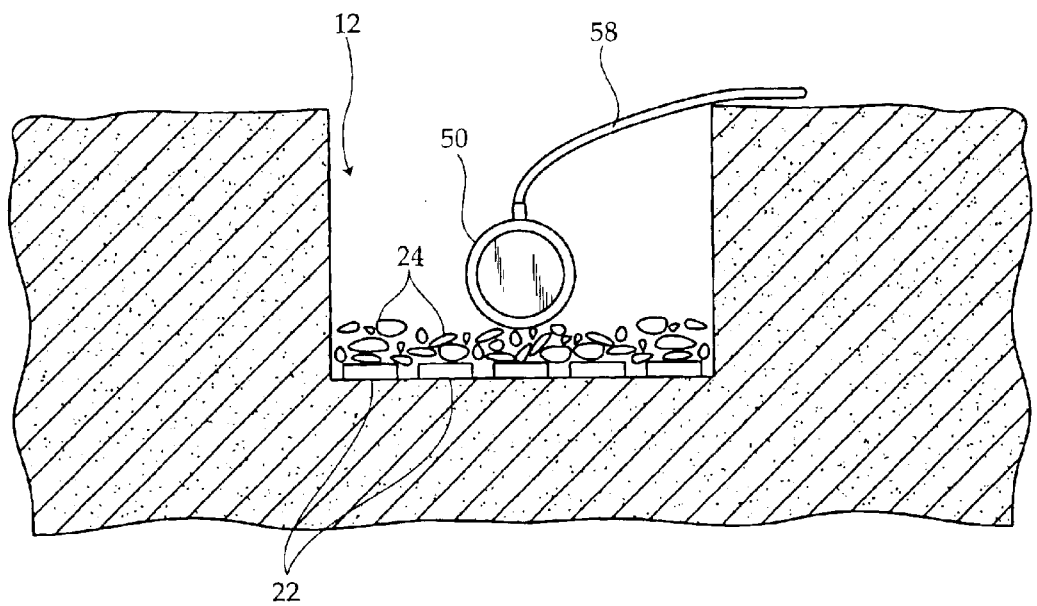
FIG. 2 is a cross sectional view, wherein the tiles have been covered by small rocks, and the water tank has been placed above the rocks according to the present invention.

Referring to FIG. 2, once the base layer 20 has been created using the tiles 22, a layer of small rocks 24, which may comprise gravel or broken cement, is placed directly over the tiles 22 of the base layer 20. A water tank 50 is placed longitudinally within the hole 12.

Figure 4:
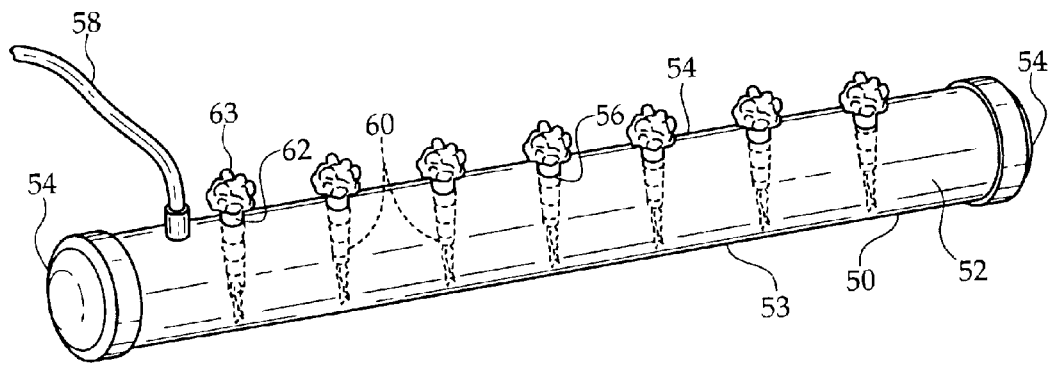
FIG. 4 is a perspective view, illustrating the wicking devices partially extending upward from the water tank.

Referring to FIG. 4, the water tank 50 is substantially cylindrical and hollow, having a tubular sidewall 52 and a pair of end caps 54 which together define an interior volume. The sidewall 52 has a bottom surface 53 and a top surface 54. The top surface 54 has a plurality of wick openings 56 which are periodically spaced longitudinally along the water tank 50. In addition, a fill hose 58 is attached to the water tank 50 at the top surface, in communication with the interior volume, for adding water to said water tank 50.

A plurality of wick assemblies 60 extend in the wick openings 56, and extend both downwardly into the interior volume and upward from the top surface 54.

Figure 3:
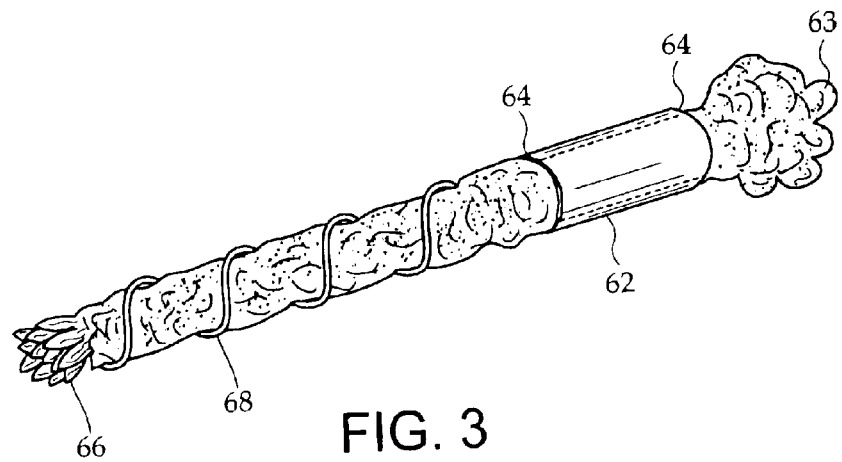
FIG. 3 is a diagrammatic perspective view, illustrating one of the wicking devices according to the present invention.

FIG. 3 details one of the wick assemblies 60. In particular, each wick assembly has small tube 62 having two open ends 64 with a wick 66 extending therethrough. Each wick 66 has a head 63 at its uppermost point. In particular, the wick 66 is a soft absorbent material, such as cotton, and may be similar to air conditioner filter material. The wick 66 is bound tightly with fine copper wire 68 to facilitate its insertion into the small tube 62. The copper wire 69 wraps around the wick 66 in a spiral substantially from end to end, extending to nearly the head 63. Preferably the wick 66 is substantially five inches long, and the small tube 62 is approximately one inch long, and one-quarter inch in diameter.

The small tubes 62 are inserted partially into the wick openings 56 and are secured thereat. Accordingly the small tubes 62 extend transverse to the tubular sidewall 52 of the tank. Typically, both the tank and the small tubes 62 are made of plastic. Accordingly, each tube 62 is preferably secured to the tank top surface 64 with a cyanoacrylicate adhesive applied around wick openings 56. Preferably, the tank is a PVC tube having a diameter of approximately 4 inches. Preferably, the small tubes 62 are attached to the tank midway on said tube 62. Accordingly, the wick assembly 60 extends to nearly the tank bottom 53 so as to fully utilize any water contained therein.

The wick assemblies 60 act as a moisture accumulator, siphoning water upward into the soil by capillary action, and slowly release the water into the soil. Accordingly, the water is released in a time-released fashion.

Figure 7:
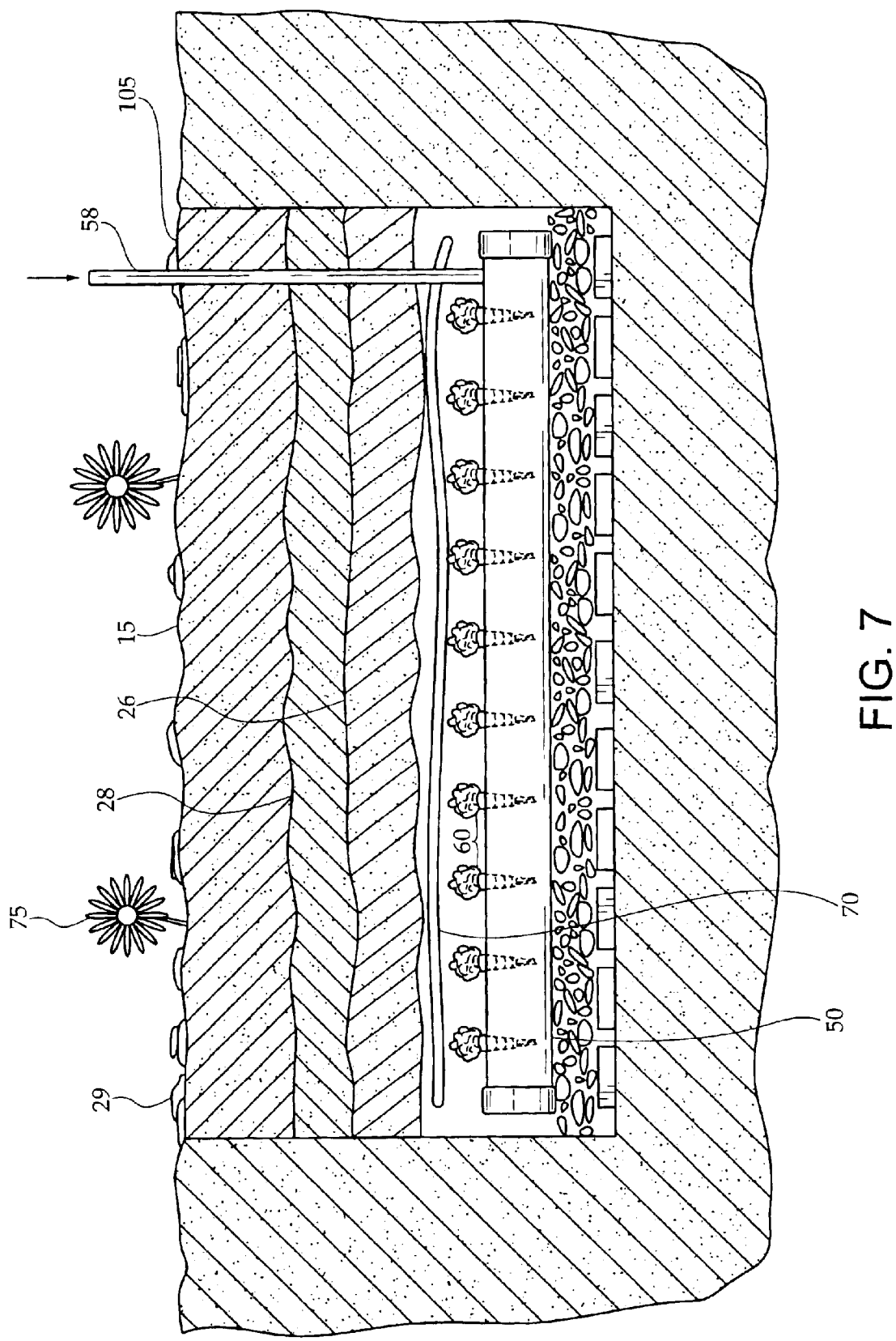
FIG. 7 is a cross sectional view of a planting area, illustrating the water tank installed underground, between the ordered layers as set forth by the present invention.

Referring to FIG. 7, once the tank 50 is in place, the fill hose 58 is positioned so that it extends to above the ground surface 10S, the fill hose 58 may also be networked with fill hoses 58 attached to other tanks 50 to irrigate other adjacent planting areas 10.

After the tank 60 has been positioned within the hole, it is covered with a filter sheet 70. The filter sheet 70 is preferably made of air conditioning filter material. The filter sheet 70 helps spread out moisture from the wick assemblies 60. In addition, the filter sheet 70 helps remove chemicals from the water (such as chlorine) before it reaches the upper soil and roots.

Additional layers are added thereabove to supply the nutritive and physical base for allowing the plants to grow. Accordingly, a layer of vegetative cuttings 26 is placed over the tank 50. The vegetative cuttings 26 can be cut branches, leaves, twigs, or the like.

A layer of manure 28 is placed over the vegetative cuttings 26. The layer of manure can be up to two feet deep. Chicken, steer, or horse manure can be used—whichever is most convenient.

Above the manure 28, the topsoil 15 is replaced. However, the topsoil 15 is preferably mixed with sand, and then is used to create the uppermost one-foot layer, which should reach the same level as the original ground surface 10S. Only fertile topsoil 15 should be used. Non-fertile soil should be discarded elsewhere. The topsoil and sand layer 15 should be covered with bark 29, which helps keep moisture in the soil.

Once all layers have been established, the contents must settle in order to create a stable environment for planting. The easiest way to compact the soil is for the gardener to step on it with his own body weight. Then, the garden 10 must be watered well, using an ample quantity of water 31, as seen in FIG. 3. Watering the soil will not only add moisture to the various layers, but will also help the components thereof settle properly. In addition, the tank 50 should be filled with water, using the fill hose 58. Generally, the tank 50 should be refilled every two weeks. However, each gardener can determine the frequency that the tank is filled based upon experience with his/her plants and climate.

When planting, potting soil should be used. As seen in FIG. 7, an ecosystem is created. Accordingly, heat from the sun penetrates the various layers, and reaches the tiles 22 of the base level 20. The heat is reflected by the shiny surface of the tiles 22, carrying moisture upward from the surrounding area. The layer of small rocks 24 act as a heat accumulator—they are capable of storing a large quantity of heat. However, the topsoil layer 15, which includes sand particles, will help hold the heat below, thus creating a warm and moist subterranean region, which can be easily tapped by an exotic plant 70.

In addition, water seeps up through the wick assemblies 60 by capillary action, where it is distributed to the plants and roots. Aeration occurs through the fill hose 58, which also acts as a vent to the subterranean region. Aeration of the soil occurs as the tank empties, and as it fills. Such aeration helps prevent the roots from rotting and promotes root growth and expansion.

Condensation occurs both inside and outside the tank due to colder air reaching the water tank 50 at night, including through cooled air traveling into the tank 50 through the fill hose 58. This moisture is extremely healthy for plants since it is pure water.

The present invention may also be used with a potted plant 75. Accordingly, the tank 50 is cradled within a frame

Figure 5:
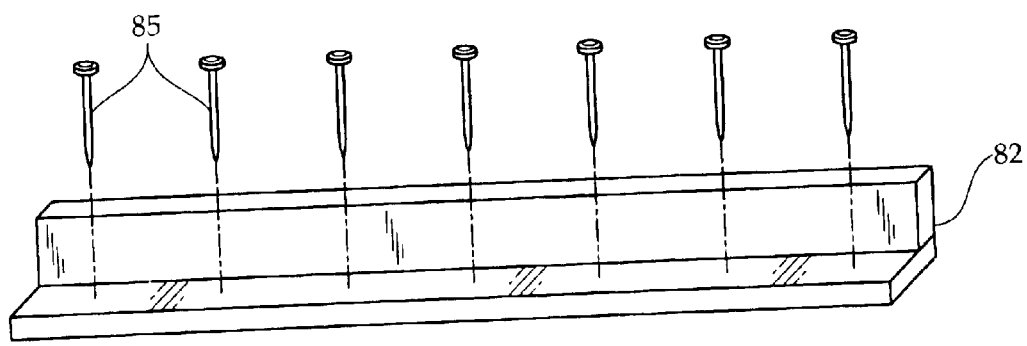
FIG. 5 illustrates one portion of a frame used to partially enclose the water tank when configured for use with potted plants.
Figure 6:
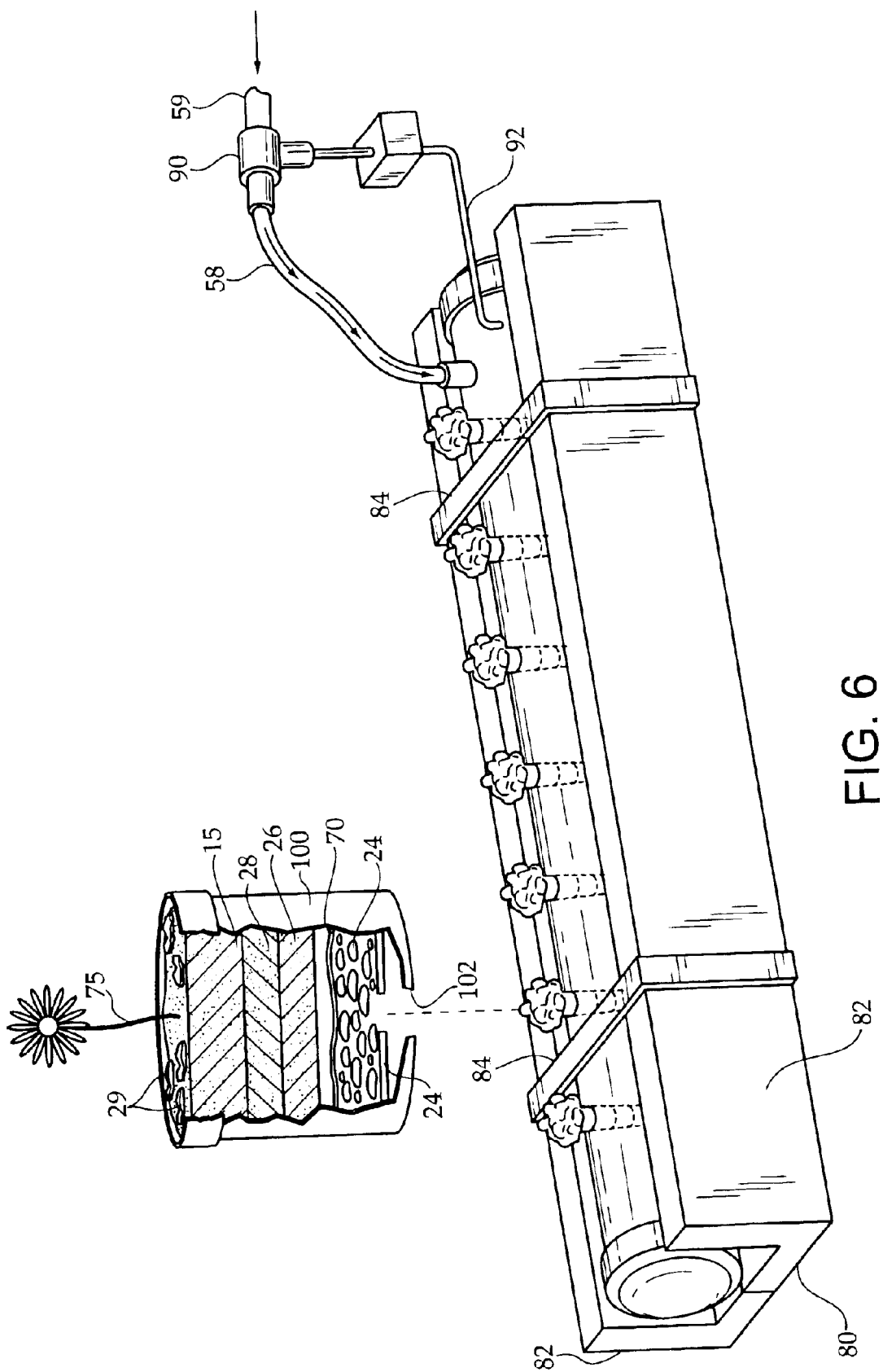
FIG. 6 is a diagrammatic perspective view, illustrating the water tank mounted within the frame, wherein a fill hose is in communication with the water tank through a solenoid, and a water sensor is also in communication with the water for selectively activating the solenoid when moisture within the tank is detected as being below a calibrated moisture level.

80, comprising two complementary L-shaped portions 82, one of which is being assembled with nails 85 in FIG. 5. The tank 50 is shown connected within the frame 80 in FIG. 6. The frame 80 is substantially open at the top to allow the wick assemblies 60 to extend upward therefrom. Straps 84 may extend across the top 80T of the frame 80 to hold the tank 50 securely within the frame 80.

In use, potted plants are placed immediately above or on top of the frame 80. The potted plants 75 are contained within pots 100, which have a hole 102 at the bottom. The pot is positioned upon the tank 50 so that the wick assemblies 60 are in communication with the pot holes 102, so that they can impart moisture to the plants, similar to the 'in-ground' configuration shown in FIG. 7. Accordingly, a similar ordering of layers within the pot should be established, except that the tank 50 is positioned below the tiles 22 which are at the bottom of the pot 100. Thus, the tiles 22 are covered by small rocks 24, the filter sheet 70, the vegetative 26 and/or manure 28 layers, and the topsoil mixed with sand layer 15. The ground surface 10S is preferably covered with bark 29.

In accordance with a further embodiment of the invention, a solenoid valve 90 may be interposed between a water source 59, and the fill hose 58 and tank 50. In addition, a water sensor 92 is mounted to monitor the moisture within the tank 50 interior. The solenoid valve 90 is operable in response to a low moisture level to fill the tank 50. Thus, when a moisture level below a predetermined, calibrated level is measured within the tank 50, the solenoid valve 90 is operated to fill the tank 50. Accordingly, irrigation can take place automatically.

Accordingly, the ordered establishment of the layers and the integral irrigation tank as recited helps create a cultivation system having unique thermodynamic and nutritive properties which keep the exotic plant warm, moist, and well nourished. The environment thus created allows the exotic plants to not only survive, but to thrive, growing faster than they would in their natural habitats.

The invention has been described by example using the accompanying drawing figures and foregoing description. It should be understood, however, that such illustrations are exemplative only. Numerous variations are possible, while adhering to the principles of the invention. Such variations are contemplated as being a part of the present invention.

What is claimed is:

1. A system for cultivating exotic plants in a garden having a ground surface, using a tank having a tubular side wall having a top surface, an internal volume, a plurality of wick assemblies, and a fill hose in communication with the internal volume, the wick assemblies are in communication with the internal volume through the top surface, comprising the steps of:

digging a hole in the garden while saving topsoil from said hole;

establishing a base layer of ceramic tiles;

establishing a layer of small rocks therabove;

positioning the tank thereon with the fill hose extending out of the hole and the wick assemblies oriented upward;

establishing a layer of vegetative cuttings thereabove;

establishing a layer of manure thereabove;

establishing a layer made of the top soil mixed with sand thereabove;

allowing the layers to settle;

thoroughly watering the layers;

filling the tank by adding water to the fill hose, and planting an exotic plant near the ground surface.

2. The system for cultivating exotic plants as recited in claim 1, wherein the layer of tank has a tubular side wall having a top surface and a pair of end caps, the fill hose is connected at the top surface so that the tank will maintain a quantity of water therein after it is filled.

3. The system for cultivating exotic plants as recited in claim 2, wherein the step of filling the tank further comprises connecting the fill hose to a water supply, and disconnecting the fill hose from the water supply; and wherein the steps as recited is followed by the steps of waiting for the tank to substantially empty, and then repeating the step of filling the tank.

4. The system for cultivating exotic plants as recited in claim 3, wherein the hole is dug to a depth of substantially three feet, wherein the layer of manure is substantially two feet deep, and wherein the layer of top soil is substantially one foot deep.

5. The system for cultivating exotic plants as recited in claim 4, wherein each wick assembly further comprises a wick wrapped tightly in copper wire, defining a head at one end, a small tube through which the wick and copper wire extend up to the head, wherein the top surface of the tank has a plurality of wick openings, and wherein the wick assemblies extend through the wick openings to communicate water from the tank interior to the head.

6. The system for cultivating exotic plants as recited in claim 3, wherein the hole is dug to a depth of substantially three feet, wherein the layer of manure is substantially two feet deep, and wherein the layer of top soil is substantially one foot deep.

7. A system for cultivating exotic plants in a garden having a ground surface, using a tank having a top surface, an internal volume, a plurality of wick assemblies, and a fill hose in communication with the internal volume, the wick assemblies are in communication with the internal volume through the top surface, comprising the steps of:

digging a hole in the garden while saving topsoil from said hole;

establishing a base layer of ceramic tiles;

establishing a layer of small rocks therabove;

positioning the tank thereon with the fill hose extending out of the hole and the wick assemblies oriented upward;

establishing a layer made of a sheet of filter material thereabove.

establishing a layer made of the top soil mixed with sand thereabove;

thoroughly watering the layers;

filling the tank by adding water to the fill hose;

planting an exotic plant near the ground surface;

allowing water to seep out of the tank into the soil above the tank through the wick assemblies; and refilling the tank.

8. The system for cultivating exotic plants as recited in claim 7, further using a moisture sensor in communication with the tank interior and a solenoid valve connected between the fill hose and a water supply, and wherein the step of refilling the tank further comprises waiting until the moisture sensor reads below a calibrated level, and opening the solenoid valve to allow water to flow into the fill tube.

9. The system for cultivating exotic plants as recited in claim 8, wherein each wick assembly further comprises a wick wrapped tightly in copper wire, defining a head at one end, a small tube through which the wick and copper wire extend up to the head, wherein the top surface of the tank has a plurality of wick openings, and wherein the wick assemblies extend through the wick openings to communicate water from the tank interior to the head.

10. The system for cultivating exotic plants as recited in claim 9, wherein the filter layer is covered by a layer of vegetative cuttings further comprises leafs, branches, and twigs and the layer of vegetative cuttings is covered by a layer of manure selected from chicken manure, steer manure, and horse manure.

11. The system for cultivating exotic plants as recited in claim 8, wherein the filter layer is covered by a fertilizer layer selected from vegetative cuttings and manure.

12. The system for cultivating exotic plants as recited in claim 7, further using a moisture sensor in communication with the tank interior and a solenoid valve connected between the fill hose and a water supply, and wherein the step of refilling the tank further comprises waiting until the moisture sensor reads below a calibrated level, and opening the solenoid valve to allow water to flow into the fill tube.

13. A system for cultivating exotic plants in a pot having hole, using a tank having a top surface, an internal volume, a plurality of wick assemblies, and a fill hose in communication with the internal volume, the wick assemblies are in communication with the internal volume through the top surface, comprising the steps of:

establishing a base layer of at least one ceramic tile within the pot;

establishing a layer of small rocks therabove;

positioning the tank thereon with the fill hose extending out of the hole and the wick assemblies oriented upward;

establishing a layer made of a sheet of filter material thereabove;

establishing a layer made of the top soil mixed with sand thereabove up to a ground surface;

planting an exotic plant near the ground surface;

positioning the pot onto of the tank with one of the wick assemblies in communication with the hole;

allowing water to seep out of the tank into the pot through the wick assemblies; and refilling the tank.

* * * * *